(12) United States Patent
Sakai et al.

(10) Patent No.: US 11,345,811 B2
(45) Date of Patent: *May 31, 2022

(54) LIQUID CRYSTAL POLYMER COMPOSITION FOR FOAM MOLDING, METHOD FOR PRODUCING FOAM MOLDED BODY, AND FOAM MOLDED BODY

(71) Applicant: Sumitomo Chemical Company, Limited, Tokyo (JP)

(72) Inventors: Taiga Sakai, Tsukuba (JP); Mitsuo Maeda, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 16/461,074

(22) PCT Filed: Nov. 16, 2017

(86) PCT No.: PCT/JP2017/041270
§ 371 (c)(1),
(2) Date: May 15, 2019

(87) PCT Pub. No.: WO2018/092845
PCT Pub. Date: May 24, 2018

(65) Prior Publication Data
US 2019/0264023 A1    Aug. 29, 2019

(30) Foreign Application Priority Data

Nov. 18, 2016  (JP) .............................. JP2016-225039

(51) Int. Cl.
*C08L 67/04*   (2006.01)
*C08J 9/00*    (2006.01)
*C08J 9/12*    (2006.01)

(52) U.S. Cl.
CPC ............ *C08L 67/04* (2013.01); *C08J 9/0066* (2013.01); *C08J 9/12* (2013.01); *C08J 2203/08* (2013.01);
(Continued)

(58) Field of Classification Search
CPC ... C08L 67/04; C08J 2367/04; C08J 2467/04; C08J 9/0066; C08J 2203/08
See application file for complete search history.

(56) References Cited

U.S. PATENT DOCUMENTS

| 4,429,060 A | 1/1984 | Ide |
| 4,889,886 A | 12/1989 | Wada et al. |

(Continued)

FOREIGN PATENT DOCUMENTS

| CN | 105273366 A | 1/2016 |
| CN | 105542408 A | 5/2016 |

(Continued)

OTHER PUBLICATIONS

Machine Translation of JP 2003170432 (Year: 2020).*
(Continued)

*Primary Examiner* — Michael M Dollinger
(74) *Attorney, Agent, or Firm* — Panitch Schwarze Belisario & Nadel LLP

(57) ABSTRACT

A liquid crystalline polymer composition for foam molding using a supercritical fluid as a foaming agent. The liquid crystalline polymer composition includes a liquid crystalline polymer and a scale-like inorganic filler, in which a content of the scale-like inorganic filler is 1 part by mass or more and 20 parts by mass or less with respect to 100 parts by mass of the liquid crystalline polymer composition.

14 Claims, 2 Drawing Sheets

(52) U.S. Cl.
CPC ........ *C08J 2367/04* (2013.01); *C08J 2467/04* (2013.01); *C08L 2203/14* (2013.01); *C08L 2205/025* (2013.01); *C08L 2205/12* (2013.01)

(56) References Cited

U.S. PATENT DOCUMENTS

| | | | |
|---|---|---|---|
| 4,943,606 | A | 7/1990 | Inoue et al. |
| 5,997,765 | A | 12/1999 | Furuta et al. |
| 6,232,354 | B1 | 5/2001 | Tan |
| 6,294,115 | B1 | 9/2001 | Blizard et al. |
| 2006/0264580 | A1 | 11/2006 | Mullen |
| 2006/0287441 | A1 | 12/2006 | Miyama et al. |
| 2007/0275242 | A1 | 11/2007 | Gopal et al. |
| 2012/0025421 | A1 | 2/2012 | Fukuhara et al. |
| 2012/0329975 | A1 | 12/2012 | Hosoda et al. |
| 2013/0116354 | A1 | 5/2013 | Rohatgi et al. |
| 2013/0172434 | A1* | 7/2013 | Park .................... C08L 101/00 521/76 |
| 2013/0209784 | A1 | 8/2013 | Nakagawa et al. |
| 2015/0148466 | A1 | 5/2015 | Immel et al. |
| 2015/0353827 | A1 | 12/2015 | Hegi |

FOREIGN PATENT DOCUMENTS

| | | | |
|---|---|---|---|
| JP | 64-061087 | A | 3/1989 |
| JP | H08-015953 | A | 1/1996 |
| JP | H10158493 | A | 6/1998 |
| JP | 2001-098102 | A | 4/2001 |
| JP | 2003-138054 | A | 5/2003 |
| JP | 2003-170432 | A | 6/2003 |
| JP | 2004250620 | A | 9/2004 |
| JP | 2009-000964 | A | 1/2009 |
| JP | 2013007004 | A | 1/2013 |
| JP | 2013-185044 | A | 9/2013 |
| JP | 2015010117 | A | 1/2015 |
| JP | 2015-117351 | A | 6/2015 |
| JP | 2015147882 | A | 8/2015 |
| WO | 0134702 | A2 | 5/2001 |
| WO | 2012/060392 | A1 | 5/2012 |

OTHER PUBLICATIONS

Machine Translation of JP 2013185044 (Year: 2020).*
Extended European Search Report dated Apr. 1, 2020 in EP Application No. 17872368.0.
Int'l Search Report dated Feb. 20, 2018 in Int'l Application No. PCT/JP2017/041270.
Huang et al., Use of Microcellular Foam Materials in Constrained Layer Damping Treatments, Cellular Polymers, vol. 20, No. 2, pp. 101-114 (2001).
Office Action dated Oct. 21, 2021 in TW Application No. 106139654.
Office Action dated Dec. 7, 2021 in U.S. Appl. No. 16/461,052, by Sakai.
Office Action dated Jun. 15, 2021 in JP Application No. 2018551681 (with English Machine Translation).
Hansen, F., "Plastic Extrusion Technology," China Light Industry Press, 2nd Edition, pp. 314-315 (Jan. 2001).
Jialong, W., "Production Process Manual for Plastic Extrusion Products," China Light Industry Press, 1st Edition, p. 323 (Jan. 2002).
Office Action dated Aug. 17, 2021 in JP Application No. 2018551675 (with English Machine Translation).
Office Action dated Sep. 13, 2021 in CN Application No. 201780070378.0 (with English Machine Translation).
Office Action dated Sep. 22, 2021 in CN Application No. 201780070200.6 (with English Machine Translation).
Extended European Search Report dated Mar. 27, 2020 in EP Application No. 17871390.5.
Int'l Search Report dated Feb. 20, 2018 in Int'l Application No. PCT/JP2017/041247.
Office Action dated Jan. 25, 2021 in TW Application No. 106139653.
Office Action dated Apr. 19, 2021 in U.S. Appl. No. 16/461,052, by Sakai.
Office Action dated Oct. 27, 2020 in U.S. Appl. No. 16/461,052, by Sakai.
Ruiz-Herrero et al., "Polymeric Foams," Encyclopedia of Polymer Science and Technology, pp. 1-39 (2015).
Office Action dated Jan. 27, 2021 in EP Application No. 17872368.0.
Office Action dated Mar. 29, 2021 in CN Application No. 201780070378.0 (with English Machine Translation).
Office Action dated Apr. 26, 2021 in CN Application No. 201780070200.6 (with English Machine Translation).
Office Action dated Apr. 5, 2022 in U.S. Appl. No. 16/461,052, by Sakai.

* cited by examiner

LIQUID CRYSTAL POLYMER COMPOSITION FOR FOAM MOLDING, METHOD FOR PRODUCING FOAM MOLDED BODY, AND FOAM MOLDED BODY

CROSS-REFERENCE TO RELATED APPLICATIONS

This application is a Section 371 of International Application No. PCT/JP2017/041270, filed Nov. 16, 2017, which was published in the Japanese language on May 24, 2018 under International Publication No. WO 2018/092845 A1, which claims priority under 35 U.S.C. § 119(b) to Japanese Application No. 2016-225039, filed on Nov. 18, 2016, the disclosures of which are incorporated herein by reference in their entireties.

TECHNICAL FIELD

The present invention relates to a liquid crystalline polymer composition for foam molding, a method for producing a foamed molded article, and a foam molded article.

BACKGROUND ART

Conventionally, since plastics are lighter than metals, they are widely adopted in various application fields such as electrical and electronic components, automobile parts, miscellaneous goods and the like. In addition, as the demand for further weight reduction of plastics is increasing, a technique of using a chemical foaming agent and a technique of foaming a resin by heating or the like are known as techniques of lowering the specific gravity and reducing the weight of a resin product.

Patent Documents 1 and 2 describe a foamed molded article of a liquid crystalline polyester resin which is foamed and molded using a supercritical fluid.

CITATION LIST

Patent Documents

[Patent Document 1] Japanese Unexamined Patent Application, First Publication No. 2013-185044
[Patent Document 2] Japanese Unexamined Patent Application, First Publication No 2003-138054

SUMMARY OF INVENTION

Technical Problem

However, the weight reduction rate of a foamed molded article of a conventional liquid crystalline polyester is not sufficiently high, and further weight reduction is required.

Further, recently, foamed molded articles using resins are used in a wide variety of fields, and in addition to weight reduction, other physical properties are also required in some cases. For example, when used for each part of an automobile, vibration damping properties are also required in addition to weight reduction of the foamed molded article. However, there is a trade-off relationship between the weight reduction and the vibration damping properties of the foamed molded article, and if the degree of weight reduction is increased, the vibration damping properties tend to be lowered.

That is, there is a demand for a liquid crystalline polymer composition for foam molding to be used for a foamed molded article which is sufficiently lightened and has sufficient vibration damping properties.

The present invention has been made in view of such circumstances, with an object of providing a liquid crystalline polymer composition for foam molding to be used for a foamed molded article which is lightweight and excellent in vibration damping properties, a method for producing a foamed molded article, and a foam molded article.

Solution to Problem

The present invention includes the following aspects.

[1] A liquid crystalline polymer composition for foam molding using a supercritical fluid as a foaming agent, the liquid crystalline polymer composition including a liquid crystalline polymer and a scale-like inorganic filler, wherein a content of the aforementioned scale-like inorganic filler is 1 part by mass or more and 20 parts by mass or less with respect to 100 parts by mass of the aforementioned liquid crystalline polymer composition.

[2] The liquid crystalline polymer composition for foam molding according to [1], wherein the aforementioned liquid crystalline polymer is a liquid crystalline aromatic polyester resin.

[3] A method for producing a foamed molded article, the method including a step of melt-kneading a mixture containing the liquid crystalline polymer composition for foam molding according to [1] or [2] and a supercritical fluid, and a step of foam molding the aforementioned mixture by lowering at least one of a pressure and a temperature of the aforementioned melt-kneaded mixture to below a critical point of the aforementioned supercritical fluid.

[4] The method for producing a foamed molded article according to [3], wherein a content of the aforementioned supercritical fluid in the aforementioned mixture is 0.01 parts by mass or more and 10 parts by mass or less with respect to 100 parts by mass of the aforementioned liquid crystalline polymer composition for foam molding.

[5] A foamed molded article molded from the liquid crystalline polymer composition for foam molding according to [1] or [2] and having a weight reduction rate represented by the following formula (1) of 20% or more and 90% or less, $$\text{weight reduction rate } (\%) = 100 \times (dB - dA)/dB \tag{1}$$

(In the formula (1), dB represents a true density (g/cm$^3$) of the aforementioned liquid crystalline polymer composition for foam molding, and dA represents an apparent density (g/cm$^3$) of the aforementioned foamed molded article.)

Advantageous Effects of Invention

According to the present invention, it is possible to provide a liquid crystalline polymer composition for foam molding to be used for a foamed molded article which is lightweight and excellent in vibration damping properties, a method for producing a foamed molded article, and a foamed molded article.

DESCRIPTION OF EMBODIMENTS

<Liquid Crystalline Polymer Composition for Foam Molding>

A liquid crystalline polymer composition for foam molding according to one embodiment of the present invention is a liquid crystalline polymer composition used for foam molding using a supercritical fluid as a foaming agent, characterized in that a liquid crystalline polymer and a scale-like inorganic filler are contained, and a content of the aforementioned scale-like inorganic filler is 1 part by mass or more and 20 parts by mass or less with respect to 100 parts by mass of the aforementioned liquid crystalline polymer resin composition.

The liquid crystalline polymer composition for foam molding according to the present embodiment can be suitably used for molding a foamed molded article provided with an inner layer composed of a foamed layer and an outer layer composed of a non-foamed layer. In addition, it can be suitably used for molding a foamed molded article having a high weight reduction rate.

Figure 1:
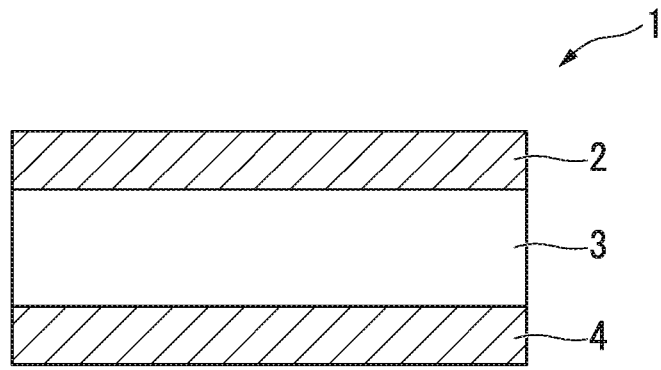
FIG. 1 is a cross-sectional view of an example of a foamed molded article according to one embodiment of the present invention.

FIG. 1 shows a cross-sectional view of an example of a foamed molded article molded from a liquid crystalline polymer composition for foam molding according to one embodiment of the present invention. In FIG. 1, a foamed molded article 1 includes an inner layer 3 composed of a foamed layer, and an outer layer 2 and an outer layer 4 composed of non-foamed layers. The foamed layer 3 is a foamed layer formed by using a supercritical fluid as a foaming agent.

In the present specification, the non-foamed layer may be referred to as "skin layer" and the foamed layer may be referred to as "core layer".

The liquid crystalline polymer composition for foam molding according to the present embodiment contains a specific amount of scale-like inorganic filler so that when foam molding is performed, it is possible to form an inner layer as a foamed layer without damaging an outer layer as a non-foamed layer, and to realize homogeneous foaming and a high degree of weight reduction.

When an inorganic filler is contained in the liquid crystalline polymer composition for foam molding, since the inorganic filler serves as a starting point for foaming, foaming in the foamed molded article can be homogenized. However, when the content of a fibrous inorganic filler is high, since the fibrous inorganic filler is exposed by penetrating through the non-foamed layer, outgassing from the inner layer as the foamed layer occurs, and the weight reduction rate of the foamed molded article cannot be increased, which is a problem.

On the other hand, when the liquid crystalline polymer composition for foam molding according to the present embodiment contains a specific amount of scale-like inorganic filler and contains little or no fibrous inorganic filler, it is possible to prevent outgassing caused by exposure of the fibrous inorganic filler to the non-foamed layer, and since foaming can be performed uniformly, the inner layer as a foamed layer can be formed satisfactorily.

That is, in one aspect, the liquid crystalline polymer composition for foam molding according to the embodiment is a liquid crystalline polymer composition for foam molding using a supercritical fluid as a foaming agent, the liquid crystal polymer composition which includes a liquid crystalline polymer and a scale-like inorganic filler, and if desired, may further include a fibrous inorganic filler, wherein a content of the scale-like inorganic filler is 1 part by mass or more and 20 parts by mass or less with respect to 100 parts by mass of the aforementioned liquid crystalline polymer resin composition, and a content of the aforementioned fibrous inorganic filler is 0 parts by mass or more and 5 parts by mass or less with respect to 100 parts by mass of the aforementioned liquid crystalline polymer resin composition.

In another aspect, the liquid crystalline polymer composition for foam molding according to one embodiment of the present invention is a liquid crystalline polymer composition used for foam molding using a supercritical fluid as a foaming agent, the liquid crystalline polymer composition including a liquid crystalline polymer and a scale-like inorganic filler, and including no fibrous inorganic filler, wherein a content of the scale-like inorganic filler is 1 part by mass or more and 20 parts by mass or less with respect to 100 parts by mass of the aforementioned liquid crystalline polymer resin composition.

The liquid crystalline polymer contained in the liquid crystalline polymer composition for foam molding according to the present embodiment is preferably a liquid crystalline aromatic polyester resin.

(Liquid Crystalline Aromatic Polyester Resin)

A liquid crystalline aromatic polyester resin (hereinafter sometimes referred to as liquid crystalline aromatic polyester) is an aromatic polyester exhibiting optical anisotropy at the time of melting. As a typical example of the liquid crystalline aromatic polyester, it is preferable to have a repeating unit represented by the following formula (1) (hereinafter sometimes referred to as "repeating unit (1)"), and it is more preferable to have the repeating unit (1), a repeating unit represented by the following formula (2) (hereinafter sometimes referred to as "repeating unit (2)") and a repeating unit represented by the following formula (3) (hereinafter sometimes referred to as "repeating unit (3)"):

$$-O-Ar^1-CO- \quad (1)$$

$$-CO-Ar^2-CO- \quad (2)$$

$$-X-Ar^3-Y- \quad (3)$$

$$-Ar^4-Z-Ar^5- \quad (4)$$

In the formulas, $Ar^1$ represents a phenylene group, a naphthylene group or a biphenylylene group; $Ar^2$ and $Ar^3$ each independently represent a phenylene group, a naphthylene group, a biphenylylene group or a group represented by the above formula (4); X and Y each independently represent an oxygen atom or an imino group (—NH—): $Ar^4$ and $Ar^5$ each independently represent a phenylene group or a naphthylene group; Z represents an oxygen atom, a sulfur atom, a carbonyl group, a sulfonyl group or an alkylidene group; and hydrogen atoms of $Ar^1$, $Ar^2$ or $Ar^3$ may each independently be substituted with a halogen atom, an alkyl group or an aryl group.

Examples of the halogen atom include a fluorine atom, a chlorine atom, a bromine atom and an iodine atom. The alkyl group is preferably an alkyl group having 1 to 10 carbon atoms, and examples thereof include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group. The aryl group is preferably an aryl group having 6 to 20 carbon atoms, and examples thereof include a phenyl group, an o-tolyl group, an m-tolyl group, a p-tolyl group, a 1-naphthyl group and a 2-naphthyl group. When the aforementioned hydrogen atom is substituted with any of these groups, the numbers of substituents in $Ar^1$, $Ar^2$ and $Ar^3$ are each independently 2 or less, and preferably 1 or less.

The alkylidene group represented by Z is preferably an alkylidene group having 1 to 10 carbon atoms, and examples thereof include a methylene group, an ethylidene group, an isopropylidene group, an n-butylidene group and a 2-ethylhexylidene group.

The repeating unit (1) is a repeating unit derived from an aromatic hydroxycarboxylic acid. As the repeating unit (1), a repeating unit derived from p-hydroxybenzoic acid (that is, $Ar^1$ is a p-phenylene group) or a repeating unit derived from 6-hydroxy-2-naphthoic acid (that is, $Ar^1$ is a 2,6-naphthylene group) is preferable.

The repeating unit (2) is a repeating unit derived from an aromatic dicarboxylic acid. As the repeating unit (2), a repeating unit derived from terephthalic acid (that is, $Ar^2$ is a p-phenylene group), a repeating unit derived from isophthalic acid (that is, $Ar^2$ is an m-phenylene group), or a repeating unit derived from 2,6-naphthalenedicarboxylic acid (that is, $Ar^2$ is a 2,6-naphthylene group) is preferable.

The repeating unit (3) is a repeating unit derived from an aromatic diol, an aromatic hydroxylamine or an aromatic diamine. As the repeating unit (3), a repeating unit derived from hydroquinone, p-aminophenol or p-phenylenediamine (that is, $Ar^2$ is a p-phenylene group) or a repeating unit derived from 4,4'-dihydroxybiphenyl, 4-amino-4'-hydroxybiphenyl or 4,4'-diaminobiphenyl (that is, Ar is a 4,4'-biphenylylene group) is preferred.

It should be noted that in the present specification, the expression "derived" means that the chemical structure is changed due to polymerization of raw material monomers, while no other structural change occurs.

In the case where the liquid crystalline aromatic polyester according to the present invention contains repeating units represented by each of the repeating units (1), (2) and (3), with respect to the total amount (number of moles) of all the repeating units constituting the liquid crystalline aromatic polyester, the content of the repeating unit (1) is 30 mol % or more, preferably from 30 to 80 mol %, more preferably from 40 to 70 mol %, and still more preferably from 45 to 65 mol %; the content of the repeating unit (2) is 35 mol % or less, preferably from 10 to 35 mol %, more preferably from 15 to 30 mol %, and still more preferably from 17.5 to 27.5 mol %; and the content of the repeating unit (3) is 35 mol % or less, preferably from 10 to 35 mol %, more preferably from 15 to 30 mol %, and still more preferably from 17.5 to 27.5 mol %. However, the total amount of the repeating unit (1), the repeating unit (2) and the repeating unit (3) does not exceed 100 mol %.

The higher the content of the repeating unit (1), the more the melt fluidity, heat resistance and strength/rigidity of the liquid crystalline aromatic polyester tend to improve, but when it exceeds 80 mol %, the melting temperature and melt viscosity tend to be high, and the temperature required for molding tends to be high.

The molar ratio of the content of the repeating unit (2) to the content of the repeating unit (3) is from 0.9/1 to 1/0.9, preferably from 0.95/1 to 1/0.95, and more preferably from 0.98/1 to 1/0.98.

The liquid crystalline aromatic polyester according to the present invention may have two or more types of repeating units (1) to (3) each independently. The liquid crystalline aromatic polyester may further have a repeating unit other than the repeating units (1) to (3), and the content thereof is 10 mol % or less, and preferably 5 mol % or less, with respect to the total amount (number of moles) of all the repeating units.

From the viewpoint of obtaining a liquid crystalline aromatic polyester having a low melt viscosity, it is preferable that each of X and Y in the repeating unit (3) is an oxygen atom (that is, it is a repeating unit derived from an aromatic diol), and a liquid crystalline aromatic polyester having a repeating unit in which each of X and Y is an oxygen atom as the only repeating unit (3) is more preferable.

The flow starting temperature of the liquid crystalline aromatic polyester according to the present invention is preferably 280° C. or higher, more preferably 290° C. or higher, and still more preferably 295° C. or higher, and at the same time, is preferably 380° C. or less, and more preferably 350° C. or less. That is, the flow starting temperature of the liquid crystalline aromatic polyester is preferably 280° C. or more and 380° C. or less, more preferably 290° C. or more and 380° C. or less, and still more preferably 295° C. or more and 350° C. or less.

The higher the flow starting temperature, the easier it is to improve heat resistance and water resistance. However, if it is too high, high temperature is required for melting, and thermal degradation tends to occur during molding, and the viscosity at the time of melting increases to lower the fluidity. That is, when the flow starting temperature is within the above range, the heat resistance and water resistance are easily improved, and it is possible to prevent the thermal degradation during molding and the increase in viscosity and decrease in fluidity during melting.

It should be noted that the "flow starting temperature" which is also referred to as flow temperature or fluidity temperature and serves as an indicator of the molecular weight of the liquid crystalline aromatic polyester, is a temperature at which a melt viscosity of 4,800 Pa·s (48,000 poise) is exhibited when using a capillary rheometer having a nozzle with an inner diameter of 1 mm and a length of 10 mm and extruding the heated melt of the liquid crystalline aromatic polyester from the nozzle at a rate of temperature increase of 4° C./min under a load of 9.8 MPa (for example, see "Liquid Crystalline Polymer—Synthesis, Molding, and Application—" edited by Naoyuki Koide, pp. 95-105, published by CMC Publishing Co., Ltd., published on Jun. 5, 1987).

For the liquid crystalline aromatic polyester, commercially available products may be used as they are, or it may be produced by a known method.

As a method for producing the liquid crystalline aromatic polyester, for example, a method for producing a liquid crystalline aromatic polyester by polymerizing (polycondensing) an aromatic hydroxycarboxylic acid, an aromatic dicarboxylic acid, and at least one compound selected from the group consisting of an aromatic diol, an aromatic hydroxyamine and an aromatic diamine can be mentioned.

In addition, for example, a method for producing a liquid crystalline aromatic polyester by polymerizing one obtained by polymerizing a plurality of types of aromatic hydroxycarboxylic acids, an aromatic dicarboxylic acid, and at least one compound selected from the group consisting of an aromatic diol, an aromatic hydroxyamine and an aromatic diamine can be mentioned.

Furthermore, for example, a method for producing a liquid crystalline aromatic polyester by polymerizing a polyester such as polyethylene terephthalate and an aromatic hydroxycarboxylic acid can be mentioned.

The content of the repeating unit containing a 2,6-naphthylene group of the liquid crystalline aromatic polyester can be controlled, for example, by changing the charge ratio of monomers at the time of polycondensation.

It is possible to produce, for example, by preparing a monomer that derives the repeating unit (1), that is, a predetermined aromatic hydroxycarboxylic acid; a monomer that derives the repeating unit (2), that is, a predetermined aromatic dicarboxylic acid; and a monomer that derives the repeating unit (3), that is, a predetermined aromatic diol, so that the total amount of monomers having a 2,6-naphthylene group, that is, the total amount of 6-hydroxy-2-naphthoic acid, 2,6-naphthalenedicarboxylic acid and 2,6-naphthalenediol is from 40 to 75 mol % with respect to the total amount (number of moles) of all the monomers, followed by polymerization (polycondensation).

At this time, the aromatic hydroxycarboxylic acid, the aromatic dicarboxylic acid and the aromatic diol may be each independently replaced partially or entirely and use instead a polymerizable derivative thereof. Examples of the polymerizable derivative of a compound having a carboxyl group, such as an aromatic hydroxycarboxylic acid and an aromatic dicarboxylic acid, include those obtained by converting a carboxyl group into an alkoxycarbonyl group or an aryloxycarbonyl group, those obtained by converting a carboxyl group into a haloformyl group, and those obtained by converting a carboxyl group into an acyloxycarbonyl group.

Examples of the polymerizable derivative of a compound having a hydroxyl group, such as an aromatic hydroxycarboxylic acid and an aromatic diol, include those obtained by acylating a hydroxyl group and converting it to an acyloxyl group.

Further, the liquid crystalline aromatic polyester according to the liquid crystalline polymer composition for foam molding of the present embodiment is preferably produced by melt polymerization of a raw material monomer corresponding to the constituting repeating unit and solid phase polymerization of the obtained polymer (prepolymer). As a result, a liquid crystalline aromatic polyester having high heat resistance, water resistance and strength can be produced with favorable operability.

Further, the melt polymerization may be carried out in the presence of a catalyst, and examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as N,N-dimethylaminopyridine and N-methylimidazole, and nitrogen-containing heterocyclic compounds are preferably used.

The content of the liquid crystalline polymer according to the liquid crystalline polymer composition for foam molding of the present embodiment is preferably 80 parts by mass or more and 99 parts by mass or less, and more preferably 90 parts by mass or more and 97 parts by mass or less, with respect to 100 parts by mass of the aforementioned liquid crystalline polymer composition for foam molding.

(Scale-Like Inorganic Filler)

In the present specification, the term "scale-like filler" means a scale-like inorganic filler having an average thickness of 0.01 to 50 μm and an aspect ratio (aspect ratio= (average particle diameter)/(average thickness)) with respect to this thickness of 3 to 10.000.

Examples of the scale-like inorganic filler include talc, mica, graphite, wollastonite, barium sulfate and calcium carbonate. The mica may be muscovite, phlogopite, fluorophlogopite or tetrasilicon mica. Among them, talc or mica can be preferably used.

By using the scale-like inorganic filler, it is possible to form an inner layer as a foamed layer without damaging an outer layer as a non-foamed layer.

The content of the scale-like inorganic filler contained in the liquid crystalline polymer composition for foam molding of the present embodiment is 1 part by mass or more and 20 parts by mass or less, preferably 2 parts by mass or more and 18 parts by mass or less, more preferably 3 parts by mass or more and 17 parts by mass or less, and particularly preferably 3 parts by mass or more and 10 parts by mass or less with respect to 100 parts by mass of the aforementioned liquid crystalline polymer composition for foam molding. When the content of the scale-like inorganic filler is within the above range, foaming can be performed satisfactorily without damaging the non-foamed layer.

(Fibrous Inorganic Filler)

A fibrous inorganic filler may be contained in the liquid crystalline polymer composition for foam molding of the present embodiment. The number average fiber diameter of the fibrous inorganic filler is preferably 15 μm or more and 25 μm or less, and more preferably 16 μm or more and 24 μm or less. One type of the fibrous filler may be used alone, or two or more types thereof may be used in combination. Examples of the fibrous inorganic filler include glass fibers; carbon fibers such as polyacrylonitrile (PAN)-based carbon fibers and pitch-based carbon fibers; ceramic fibers such as silica fibers, alumina fibers and silica alumina fibers; and metal fibers such as stainless steel fibers. In addition, examples of the fibrous inorganic filler also include whiskers such as potassium titanate whisker, barium titanate whisker, wollastonite whisker, aluminum borate whisker, silicon nitride whisker and silicon carbide whisker.

The content of the fibrous inorganic filler contained in the liquid crystalline polymer composition for foam molding may be 0 parts by mass or more and 5 parts by mass or less, may be 0 parts by mass or more and 3 parts by mass or less, or may be 0 parts by mass or more and 1 part by mass or less, with respect to 100 parts by mass of the aforementioned liquid crystalline polymer composition for foam molding, or may not be contained. When the content of the fibrous inorganic filler is within the above range, it is possible to prevent outgassing caused by exposure of the fibrous inorganic filler to the non-foamed layer and to form an inner layer as a foamed layer satisfactorily.

(Other Components)

The liquid crystalline polymer composition for foam molding according to the present embodiment may further contain at least one other component (additive) in addition to the above-mentioned liquid crystalline aromatic polyester resin and the scale-like inorganic filler as long as the effects of the present invention are not impaired.

That is, in one aspect, the liquid crystalline polymer composition for foam molding according to the present embodiment includes the above-mentioned liquid crystalline aromatic polyester resin, the scale-like inorganic filler, and, if desired, at least one member selected from the group consisting of a fibrous inorganic filler and an additive.

For example, as the additive, mold release agents such as fluororesins and metal soaps, colorants such as pigments including titanium oxide, and dyes, antioxidants, thermal stabilizers, ultraviolet absorbers, antistatic agents, surfactants and the like may be added as a component. The content of these additives is preferably 0.01 parts by mass or more and 5 parts by mass or less with respect to 100 parts by mass of the liquid crystalline polymer composition for foam molding.

<Method for Producing Foamed Molded Article>

A method for producing a foamed molded article according to one embodiment of the present invention includes a step of melt-kneading a mixture containing the above-described liquid crystalline polymer composition for foam molding and a supercritical fluid, and a step of foam molding the aforementioned mixture by lowering at least one of a pressure and a temperature of the aforementioned melt-kneaded mixture to below a critical point of the aforementioned supercritical fluid.

In order to facilitate handling in the method for producing a foamed molded article, it is preferable that the liquid crystalline polymer composition for foam molding is melt-kneaded and pelletized in advance using an extruder. Further, it is possible to uniformly disperse the scale-like inorganic filler in the liquid crystalline polymer composition for foam molding by melt-kneading in advance.

The melt-kneaded liquid crystalline polymer composition for foam molding is usually melt-molded. Examples of the melt-molding method include an injection molding method, an extrusion molding method such as a T-die method and an inflation method, a blow molding method, a vacuum molding method and a press molding method. Among them, the extrusion molding method and the injection molding method are preferable, and the injection molding method is more preferable.

As an extruder for extrusion molding, one having a cylinder, at least one screw disposed in the cylinder, and at least one supply port provided in the cylinder is preferably used, and one further having at least one vent portion provided in the cylinder is more preferably used.

The supercritical fluid acts as a foaming agent for foaming the aforementioned liquid crystalline polymer composition for foam molding. The supercritical fluid has no reactivity with the aforementioned liquid crystalline polymer composition for foam molding, and is preferably a gas under normal temperature and normal pressure (for example, temperature: 23° C., atmospheric pressure).

Here, the term "supercritical fluid" indicates a state of a substance, neither a gas, nor a liquid, nor a solid, which a substance exhibits under conditions of a specific temperature and pressure (critical point) or higher. The critical point which has a specific temperature and pressure is determined by the type of the substance.

It should be noted that in this specification, the term "supercritical fluid" means a substance showing the properties of the supercritical fluid described above. That is, the supercritical fluid in the present specification means a substance showing intermediate properties between the gaseous state and the liquid state, having a penetrating power (dissolving power) into the molten resin which is also stronger than that in the liquid state, and having a property capable of being dispersed uniformly in the molten resin.

Further, in one aspect, the term "supercritical fluid" means a substance placed under conditions of a specific temperature or pressure (critical point) or higher.

As the supercritical fluid according to the present embodiment, for example, an inert gas such as carbon dioxide, nitrogen and helium, air, oxygen, hydrogen or the like can be used. Among these examples, since nitrogen has a critical point at a temperature of −147° C. and a pressure of 3.4 MPa, the normal temperature (25° C.) is equal to or higher than the critical temperature. Therefore, since it is possible to prepare a supercritical fluid merely by controlling pressure, handling is easy, which is particularly preferable.

The amount of the supercritical fluid used is preferably 0.01 parts by mass or more and 10 parts by mass or less with respect to 100 parts by mass of the liquid crystalline polymer composition for foam molding. When the amount of the supercritical fluid as the foaming agent is 0.01 parts by mass or more, sufficient weight reduction effects by foaming can be obtained. Further, if it is 10 parts by mass or less, foamed cells suppress the enlargement, and it is possible to prevent the mechanical strength of a foam from decreasing.

[Melt-Kneading]

Figure 2:
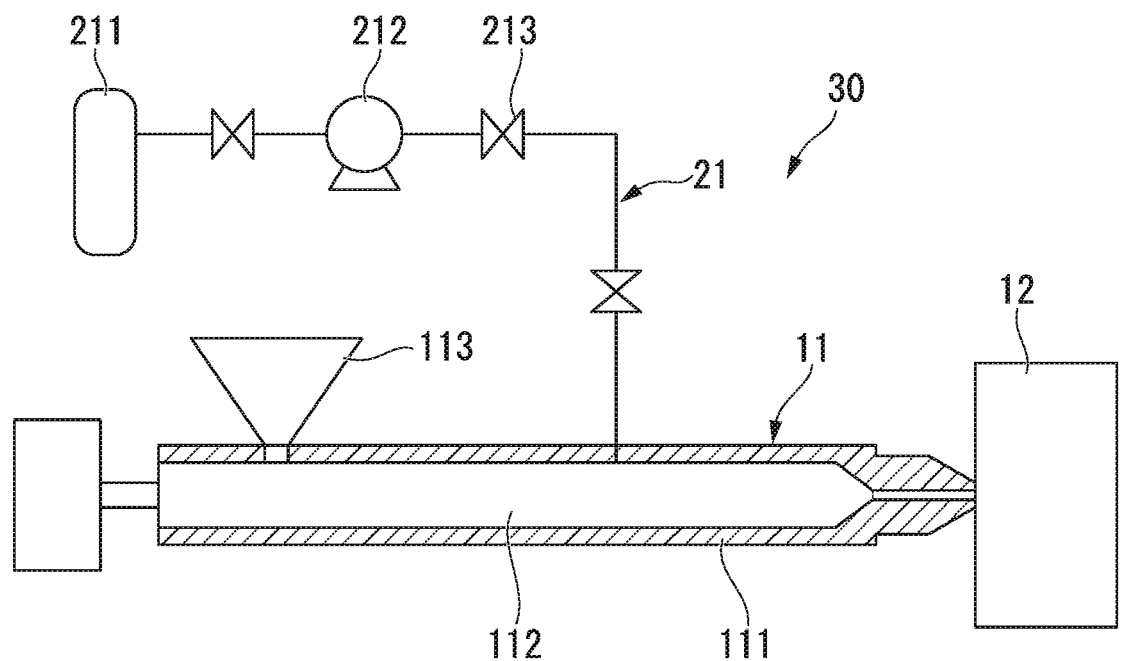
FIG. 2 is a schematic view of an injection molding machine used for producing a foamed molded article according to one embodiment of the present invention.

FIG. 2 is a schematic view of an injection molding machine used for producing a foamed molded article according to one embodiment of the present invention.

This injection molding machine 30 is a machine for producing a foamed molded article having a predetermined shape by using the above-mentioned liquid crystalline polymer composition for foam molding and a foaming agent, and includes a main body 11, a mold 12, and a supercritical fluid introduction device 21 for introducing the supercritical fluid constituting a foaming agent into the main body 11.

The introduction device 21 includes a gas cylinder 211 filled with a source gas of the above-described supercritical fluid, a booster 212 for raising the pressure of the source gas from the gas cylinder 211 to a critical pressure, and a control valve 213 for controlling the amount of the source gas pressurized to a critical pressure (supercritical fluid) introduced into a cylinder 111. The source gas is heated by adiabatically compressing the source gas in the booster 212, but when the temperature reached is lower than the critical temperature, if necessary, a temperature raising device that increases the temperature of the source gas from the gas cylinder 211 to the critical temperature is used.

Next, a method for producing a foamed molded article using this injection molding machine 30 will be described.

First, the above-described liquid crystalline polymer composition for foam molding is introduced into the cylinder 111 from the hopper 113, and heated and kneaded in the cylinder 111 to melt the liquid crystalline polymer composition for foam molding. On the other hand, the gas cylinder 211 is opened, and the pressure and the temperature of the source gas is increased to the critical point or higher by the booster 212. The obtained supercritical fluid is introduced into the cylinder 111 by opening the control valve 213 and impregnated into the melted liquid crystalline polymer composition for foam molding, and the mixture of the aforementioned liquid crystalline polymer composition for foam molding and the aforementioned supercritical fluid is melt-kneaded. At this time, the temperature and pressure inside the cylinder is set to at least the critical point of the substance related to the supercritical fluid.

[Foam Molding]

The melt-kneaded mixture of the liquid crystalline polymer composition for foam molding and the supercritical fluid (hereinafter sometimes referred to as molten resin) described above is moved by a screw 112 and injected into the mold 12 from inside the cylinder 111. At this time, until the injection of the molten resin into the mold 12 is completed, in order to maintain the supercritical state of the supercritical fluid contained in the molten resin, the mold 12 is clamped and a counter pressure may also be applied.

The temperature of the molten resin containing the supercritical fluid in the cylinder 111 decreases in the process of being injected into and maintained in the mold 12 whose temperature is adjusted to the desired temperature with a heater or the like from the inside of the cylinder 111 by the screw 112. Furthermore, the pressure which was equal to or higher than the critical pressure approaches the normal pressure, and the source gas (supercritical fluid) in the supercritical state changes into the gaseous state. That is, the source gas in the supercritical state which is dispersed in the molten resin changes from the supercritical state to a gas, whereby the volume expands and a foamed molded article is obtained. Then, after cooling and solidifying the resin in the mold 12, the molded product is taken out of the mold 12 after a predetermined cooling time has elapsed. By the above operation, it is possible to obtain a foamed molded article by injection molding.

It should be noted that the non-foamed layer is formed due to cooling and solidification of the resin on the surface of the mold before the resin foams, and the foamed layer is formed due to foaming by vaporization of the supercritical fluid before the resin solidifies.

In the method for producing a foamed molded article of the present embodiment, it is possible to also suitably produce a thin foamed molded article having a thickness of 1.5 mm or more and 10 umm or less.

<Foamed Molded Article>

The present invention provides a foamed molded article which is a foamed molded article molded from the aforementioned liquid crystalline polymer composition for foam molding, and characterized in that the weight reduction rate represented by the following formula (1) is 20% or more and 90% or less.

$$\text{Weight reduction rate (\%)} = 100 \times (dB - dA)/dB \quad (1)$$

(In the formula (1), dB represents a true density ($g/cm^3$) of the aforementioned liquid crystalline polymer composition for foam molding, and dA represents an apparent density ($g/cm^3$) of the aforementioned foamed molded article.)

The foamed molded article preferably has an inner layer as a foamed layer and an outer layer as a non-foamed layer. FIG. 1 shows a cross-sectional view of an example of a foamed molded article according to one embodiment of the present invention. In FIG. 1, the foamed molded article 1 includes the inner layer 3 composed of a foamed layer, and the outer layer 2 and the outer layer 4 composed of non-foamed layers. The foamed layer 3 is a foamed layer formed by using a supercritical fluid which is a gas under normal temperature and normal pressure (temperature: 23° C., atmospheric pressure) as a foaming agent.

In the present specification, the "non-foamed layer" in the foamed molded article means a layer having fewer closed cell structures than the foamed layer. The non-foamed layer is usually present at 1,000 µm or less from the surface layer of the foamed molded article.

The "closed cell structure" means a structure in which foams are not continuous and are arranged independently of each other, and through which a gas or a liquid cannot pass.

In the foamed molded article of the present embodiment, since the frequencies at which the foamed layer 3 and the non-foamed layers 2 and 4 resonate are different, the vibration can be attenuated. In other words, the foamed molded article of the present embodiment can achieve both weight reduction and vibration damping properties by including the foamed layer 3 and the non-foamed layers 2 and 4.

In the present embodiment, the weight reduction rate represented by the following formula (1) is 20% or more and 90% or less, preferably 30% or more and 90% or less, and more preferably 40% or more and 90% or less. In another aspect, the weight reduction rate may be from 26 to 60%.

When the weight reduction rate is within the above range, it is possible to obtain a foamed molded article superior in the balance between weight reduction and vibration damping properties as compared with a foamed molded article produced by a conventional method.

In the present embodiment, the "weight reduction rate" means a value obtained based on the numerical formula (1).

$$\text{Weight reduction rate (\%)} = 100 \times (dB - dA)/dB \quad (1)$$

[In the numerical formula (1), dB represents the apparent density ($g/cm^3$) of the liquid crystalline polymer composition for foam molding, and dA represents the apparent density ($g/cm^3$) of the foamed molded article.]

In the above formula (1), by using a test piece cut out from a molded article obtained by melt-molding a pellet composed of a liquid crystalline aromatic polyester resin composition without foaming into a predetermined size (for example, a test piece having a width of 13 mm, a length of 125 mm and a thickness of 2 to 4 mm) as a standard sample, and drying this standard sample at 200° C. for 5 hours, the true density of the liquid crystalline aromatic polyester resin composition can be calculated from the weight after drying and the volume obtained from the size measurement.

By drying a test piece cut out from a foamed molded article into a predetermined size (for example, a test piece having a width of 13 mm, a length of 125 mm and a thickness of 2 to 4 mm) at 200° C. for 5 hours, the apparent density of the foamed molded article can be calculated from the weight after drying and the volume obtained from the size measurement.

It should be noted that in the case where the foamed molded article has a foamed layer and a non-foamed layer, as the test piece, a portion in which the non-foamed layer, the foamed layer and the non-foamed layer are configured in this order may be arbitrarily cut out.

In the present embodiment, by changing the amount of the supercritical fluid used as a foaming agent, it is possible to control the weight reduction rate of the obtained foamed molded article within the above-mentioned range.

Further, the obtained foamed molded article may be subsequently subjected to molding processing (secondary processing), or may be molded at the same time as foaming to obtain a foamed molded article. Since it is possible to obtain a molded article with high productivity, it is more preferable to obtain a foamed molded article by molding and foaming simultaneously.

The foamed molded article of the present invention can be generally applied to any application to which liquid crystalline polyester resins can be applied. For example, in the field of automobiles, as injection molded articles for automotive interior materials, injection molded articles for ceiling materials, injection molded articles for wheelhouse covers, injection molded articles for trunk room linings, injection molded articles for instrument panel skin materials, injection molded articles for handle covers, injection molded articles for armrests, injection molded articles for headrests, injection molded articles for seat belt covers, injection molded articles for shift lever boots, injection molded articles for console boxes, injection molded articles for horn pads, injection molded articles for knobs, injection molded articles for airbag covers, injection molded articles for various trims, injection molded articles for various pillars, injection molded articles for door lock bezels, injection molded articles for glove boxes, injection molded articles for defroster nozzles, injection molded articles for scuff plates, injection molded articles for steering wheels, injection molded articles for steering column covers and the like can be mentioned. Examples of injection molded articles for automotive exterior materials include injection molded articles for bumpers, injection molded articles for spoilers, injection molded articles for mud guards, and injection molded articles for side moldings. Examples of other injection molded articles for automobile parts include injection molded articles for automotive headlamps, injection molded articles for glass run channels, injection molded articles for weather strips, injection molded articles for drain hoses, injection molded articles for hoses such as injection molded articles for window washer tubes, injection molded articles for tubes, injection molded articles for rack and pinion boots and injection molded articles for gaskets. More specifically, EGI tubes, armrest inserts, armrest guides, armrest bases, outer door handles, ash tray panels, ash tray lamp housings, upper garnishes, antenna inner tubes, ignition coil cases, ignition coil bobbins, inside door lock knobs, instrument panel cores, intercooler tanks, inner lock knobs, window glass sliders, window pivots, window moldings, window regulator handles, window regulator handle knobs, water pump impellers, washer nozzles, washer motor housings, air spoilers, air ducts, air duct intakes, air ventilation fins, air conditioning actuators, air control valves, air conditioning magnetic clutch bobbins, air conditioning control knobs, air flow meter housings, air regulators, extract grilles, emblems, oil cleaner cases, oil level gauges, oil brake valves, gasoline chambers, gasoline floats, gasoline injection nozzles, canisters, carburetors, carburetor valves, cooler sirocco fans, air conditioner vacuum pumps, cooling fans, clutch oil reservoirs, glove door outers, glove boxes, glove box knobs, glove box lids, condenser casings, compressor valves, commutators, circuit boards, surge tanks, thermostat housings, side brake wire protectors, side mirror stays, side mirror housings, side moldings, side louvers, silencers, silent gears, sun visor shafts, sun visor brackets, sun visor holders, sunroof frames, seat belt through anchors, seat belt tongue plates, seat belt buckles, seat belt retractor gears, generator covers, generator coil bobbins, generator bushes, shift arm coatings, shift lever knobs, junction boxes, cylinder head covers, switches, switch bases, starter interval gears, starter coil bobbins, starter levers, steering column covers, steering ball joints, steering horn pads, speed sensors, speedometer controls, speedometer driven gears, spoilers, thrust washers, sleeve bearings, center clusters, solenoid valves, timing belt covers, change lever covers, distributor caps, distributor point bushes, distributor insulated terminals, tailgates, doors, door side moldings, door trims, door latch covers, trunk rear aprons, trunk lower back finishers, transmission covers, transmission cases, transmission bushes, torque converter thrust washers, vacuum controllers, back horn housings, hatchback slide brackets, balance shaft gears, power window switch board cases, power seat gear housings, power steering tanks, bumpers, bumper clips, bumper moldings, heater core tanks, heater valves, piston valves, fuse boxes, pillar garnishes, pillar louvers, fenders, fuel injectors, fuel injector connectors, fuel injector nozzle covers, fuel strainers, fuel sedimenter cases, fuel check valves, fuel filler caps, fuel filter housings, fuel lids, brush holders, brake oil floats, brake oil reservoirs, brake reservoir caps, front end bumpers, front fenders, headrest guides, helical gears, wheel cap centers, wheel center hub caps, wheel full caps, bonnet clips, bonnet hood loopers, master cylinder pistons, meter connectors, meter panels, meter hoods, motor gears, molding clips, license plates, license plate pockets, radiator grilles, radiator tanks, lamp sockets, lamp reflectors, rear shelves, rear end bumpers, rear shelf sides, lid outers, lid clusters, lid clusters, retractable headlamp covers, relay cases, relay terminal base case coil bobbins, roof side rail garnishes, roof rails, room mirror stays, regulator cases, regulator handles, resonators, wiper arm heads, wiper arm head covers, wiper motor insulators, wiper levers, wire harness connectors, safety belt mechanism parts, rotation sensors, various switch boards, band clips for electrical wiring, electric mirror bases, interior clips, exhaust gas valves, exhaust gas pump side seals, and the like can be mentioned.

In addition, sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, semiconductors, liquid crystal displays, FDD carriages, FDD chassis, motor brush holders, parabolic antennas, computer related parts, microwave oven parts, acoustic and audio equipment parts, lighting parts, air conditioner parts, office computer related parts, telephone/facsimile related parts, copying machine related parts and the like can be mentioned.

Another aspect of the present invention is
a liquid crystalline polymer composition for foam molding using a supercritical fluid as a foaming agent,
the liquid crystal polymer composition including a liquid crystalline polymer and a scale-like inorganic filler,
wherein the aforementioned liquid crystalline polymer is a liquid crystalline aromatic polyester resin, and
preferably a liquid crystalline aromatic polyester resin containing a repeating unit (1) derived from p-hydroxybenzoic acid, a repeating unit (2) which is at least one member selected from the group consisting of a repeating unit derived from terephthalic acid and a repeating unit derived from isophthalic acid, and a repeating unit (3) derived from 4,4'-di hydroxybiphenyl;
the aforementioned scale-like filler is talc or mica;
a content of the aforementioned liquid crystalline polymer is 80 parts by mass or more and 99 parts by mass or less, and preferably 90 parts by mass or more and 97 parts by mass or less with respect to 100 parts by mass of the liquid crystalline aromatic polyester resin composition; and
a content of the aforementioned scale-like inorganic filler is 1 part by mass or more and 20 parts by mass or less, preferably 2 parts by mass or more and 18 parts by mass or less, more preferably 3 parts by mass or more and 17 parts by mass or less, and particularly preferably 3 parts by mass or more and 10 parts by mass or less, with respect to 100 parts by mass of the aforementioned liquid crystalline polymer composition.

Yet another aspect of the present invention is
a liquid crystalline polymer composition for foam molding using a supercritical fluid as a foaming agent,
the liquid crystal polymer composition including a liquid crystalline polymer and a scale-like inorganic filler, and
including no fibrous inorganic filler,
wherein the aforementioned liquid crystalline polymer is a liquid crystalline aromatic polyester resin, and
preferably a liquid crystalline aromatic polyester resin having a repeating unit (1), a repeating unit (2) and a repeating unit (3);

the aforementioned scale-like filler is talc or mica;

a content of the aforementioned liquid crystalline polymer is 80 parts by mass or more and 99 parts by mass or less, and preferably 90 parts by mass or more and 97 parts by mass or less with respect to 100 parts by mass of the liquid crystalline aromatic polyester resin composition; and a content of the aforementioned scale-like inorganic filler is 1 part by mass or more and 20 parts by mass or less, preferably 2 parts by mass or more and 18 parts by mass or less, more preferably 3 parts by mass or more and 17 parts by mass or less, and particularly preferably 3 parts by mass or more and 10 parts by mass or less, with respect to 100 parts by mass of the aforementioned liquid crystalline polymer composition.

Yet another aspect of the present invention is a method for producing a foamed molded article, the method including a step of melt-kneading a mixture containing the aforementioned liquid crystalline polymer composition for foam molding and a supercritical fluid, and a step of foam molding the aforementioned mixture by lowering at least one of a pressure and a temperature of the aforementioned melt-kneaded mixture to below a critical point of the aforementioned supercritical fluid;

wherein the aforementioned supercritical fluid is carbon dioxide, nitrogen, helium, air, oxygen or hydrogen, and is preferably nitrogen; and a content of the aforementioned supercritical fluid in the aforementioned mixture is 0.01 parts by mass or more and 10 parts by mass or less with respect to 100 parts by mass of the aforementioned liquid crystalline polymer composition for foam molding.

Yet another aspect of the present invention is a foamed molded article molded from the aforementioned liquid crystalline polymer composition for foam molding and having a weight reduction rate represented by the aforementioned formula (1) of 20% or more and 90% or less, preferably 30% or more and 90% or less, and more preferably 40% or more and 90% or less, or may be 26% or more and 60% or less.

EXAMPLES

Hereinafter, the present invention will be described more specifically with reference to examples, but the present invention is not limited to the following examples.

[Measurement of True Density of Liquid Crystalline Polymer Composition for Foam Molding]

A test piece cut out from a molded article obtained by melt-molding a pellet composed of a liquid crystalline polymer composition for foam molding without foaming into a predetermined size (a test piece having a width of 13 mm, a length of 125 mm and a thickness of 2 to 4 mm) was used as a standard sample.

This standard sample was dried at 200° C. for 5 hours or longer, and the true density of the liquid crystalline polymer composition for foam molding was calculated from the weight after drying and the volume obtained from the size measurement.

[Measurement of Apparent Density of Foamed Molded Article]

A test piece cut out from a foamed molded article into a predetermined size (a test piece having a width of 13 mm, a length of 125 mm and a thickness of 2 to 4 mm) was dried at 200° C. for 5 hours or longer by the same method as that of the true density of the liquid crystalline polymer composition for foam molding, and the apparent density was calculated from the weight after drying and the volume obtained from the size measurement.

[Measurement of Weight Reduction Rate of Foamed Molded Article]

The weight reduction rate of the foamed molded article was obtained based on the following formula (1).

$$\text{Weight reduction rate (\%)} = 100 \times (dB - dA)/dB \qquad (1)$$

(In the formula (1), dB represents a true density (g/cm) of the aforementioned liquid crystalline polymer composition for foam molding, and dA represents an apparent density (g/cm$^3$) of the aforementioned foamed molded article.)

[Measurement of Flexural Modulus of Foamed Molded Article]

The flexural modulus of the foamed molded article was determined by a three-point bending test.

Figure 3:
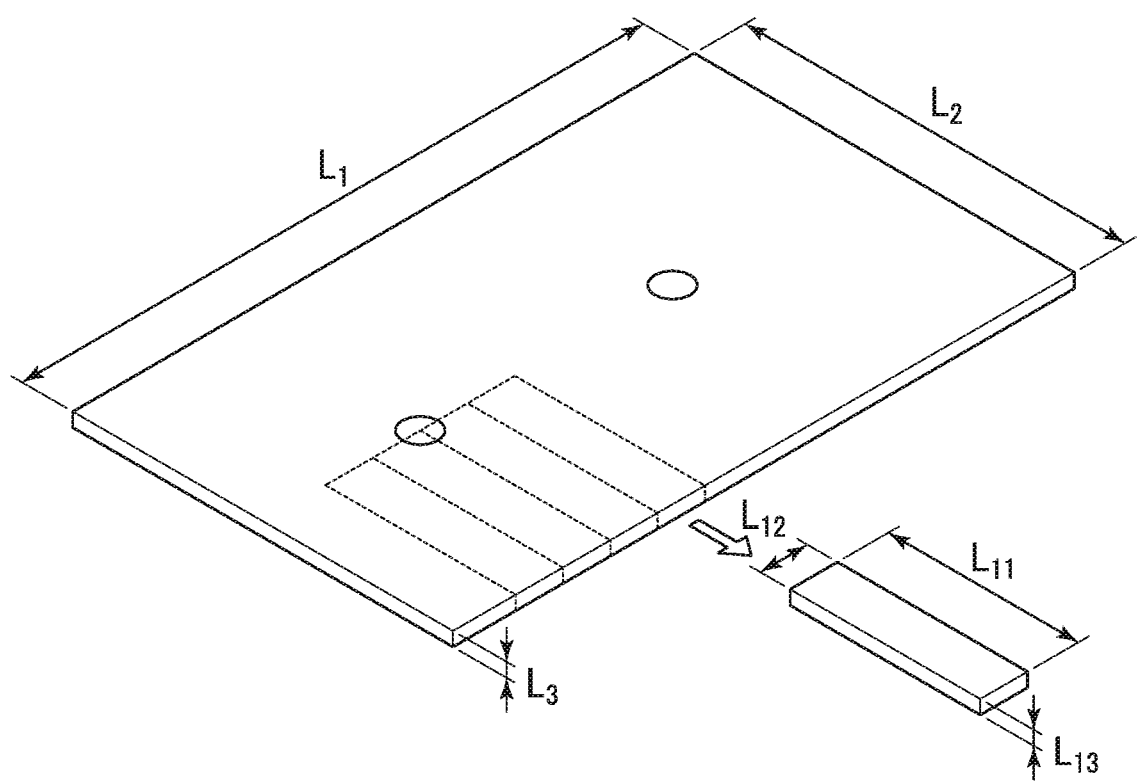
FIG. 3 is a schematic view for explaining a position for cutting out a test piece used for the measurement of flexural modulus in Examples.

First, a foamed molded article of a flat plate shape having a large size of L1 (length: 360 mm), L2 (width: 250 mm), and L3 (thickness: 2 to 4 mm) shown in FIG. 3 was produced, and a test piece (standard sample) of L12 (width: 13 mm), L11 (length: 125 mm), and L13 (thickness: 2 to 4 mm) was cut out from the obtained foamed molded article, and a value obtained for this test piece when the test was conducted under measurement conditions of a distance between spans of 50 mm and a test speed of 1 mm/min using a universal testing machine (Tensilon RTG-1250, manufactured by A & D Co., Ltd.) was adopted.

[Measurement of Vibration Characteristics of Foamed Molded Article]

The vibration characteristics of the foamed molded article were measured by the central excitation method in accordance with the test method of the vibration damping properties of the unconstrained damped composite beam (JIS K7391). From the obtained foamed molded article, a test piece as a standard sample (a test piece of L12 (width: 13 mm), L11 (length: 125 mm) and L13 (thickness: 2 to 4 mm) shown in FIG. 4), which was the same as the test piece used in the above section [measurement of flexural modulus of foamed molded article] was cut out. A measurement was made for this test piece using a vibration characteristic evaluation tester (manufactured by Ono Sokki Co., Ltd.), and the loss factor was calculated by a half power band width method.

Production Example 1 (Production of Liquid Crystalline Aromatic Polyester A)

994.5 g (7.2 mol) of parahydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1,347.6 g (13.2 mol) of acetic anhydride were placed in a reactor equipped with a stirrer, a torque meter, a nitrogen gas inlet tube, a thermometer and a reflux condenser. After replacing the gas in the reactor with nitrogen gas, 0.18 g of 1-methylimidazole was added under a nitrogen gas stream, and the temperature was raised to 150° C. over 30 minutes, and then the resulting mixture was refluxed for 30 minutes while maintaining the temperature. Thereafter, 2.4 g of 1-methylimidazole was added, and then the mixture in the reactor was heated to 320° C. over 2 hours and 50 minutes while distilling off acetic acid produced as a by-product and unreacted acetic anhydride. The reaction was terminated at a time point where an increase in torque was observed, and the contents were taken out. The obtained solid content was cooled to room temperature and pulverized with a coarse grinder, and then heated from room temperature (23° C.) to 250° C. over 1 hour in a nitrogen atmosphere, and the temperature was further raised from 250° C. to 295° C. over 5 hours and further held at 295° C. for 3 hours to allow solid phase polymerization to proceed. Thereafter, the resultant was cooled to obtain a liquid crystalline aromatic polyester A.

Production Example 2 (Production of Liquid Crystalline Aromatic Polyester B)

994.5 g (7.2 mol) of p-hydroxybenzoic acid, 446.9 g (2.4 mol) of 4,4'-dihydroxybiphenyl, 239.2 g (1.44 mol) of terephthalic acid, 159.5 g (0.96 mol) of isophthalic acid, and 1,347.6 g (13.2 mol) of acetic anhydride were placed in a reactor equipped with a stirrer, a torque meter, a nitrogen gas inlet tube, a thermometer and a reflux condenser. After replacing the gas in the reactor with nitrogen gas, 0.18 g of 1-methylimidazole was added under a nitrogen gas stream, and the temperature was raised to 150° C. over 30 minutes, and the resulting mixture was refluxed for 30 minutes while maintaining the temperature. Thereafter, 2.4 g of 1-methylimidazole was added, and then the temperature was raised to 320° C. over 2 hours and 50 minutes while distilling off acetic acid produced as a by-product and unreacted acetic anhydride. The reaction was terminated at a time point where an increase in torque was observed, and the contents were taken out. The obtained solid content was cooled to room temperature and pulverized with a coarse grinder, and then heated from room temperature to 220° C. over 1 hour in a nitrogen atmosphere, and the temperature was raised from 220° C. to 240° C. over 0.5 hours and held at 240° C. for 10 hours to allow solid phase polymerization to proceed. The resultant was cooled to obtain a liquid crystalline aromatic polyester B.

Example 1

52.25 parts by mass of the powder of the liquid crystalline aromatic polyester A, 42.75 parts by mass of the powder of the liquid crystalline aromatic polyester B and mica "AB-25S" manufactured by Yamaguchi Mica Co., Ltd. (scale-like filler, average particle diameter: 25 μm) were mixed, and melt-kneaded by using a twin screw extruder "PCM-30" manufactured by Ikegai Corp., thereby producing a pellet composed of a resin composition for foam molding.

As the melt-kneading conditions at this time, the cylinder preset temperature of the twin screw extruder was 340° C. and the screw rotation speed was 150 rpm. The cylinder preset temperature referred to here means the average value of the set temperature of a heating device provided between from the most downstream portion of the cylinder to a portion of about ⅔ of the cylinder length.

A foamed molded article having a flat plate shape (250 mm×360 mm×3 mmt) was produced from the pellet produced by the above method, using an all-electric molding machine "J450AD" manufactured by The Japan Steel Works, LTD, and a supercritical fluid production unit "SCF SYSTEM" manufactured by Trexel, Inc. At this time, when heating/weighing the resin in a cylinder at a preset temperature of 360° C., nitrogen in a supercritical state was introduced and injected into a mold at a preset temperature of 120° C., whereby nitrogen in a supercritical state became a gas in the mold.

As a result, a foamed molded article provided with an inner layer composed of a foamed layer and an outer layer composed of a non-foamed layer was produced.

Example 2

A foamed molded article provided with an inner layer composed of a foamed layer and an outer layer composed of a non-foamed layer was produced by the same method as in Example 1 except that the mixing amounts of the powder of the liquid crystalline aromatic polyester A, the powder of the liquid crystalline aromatic polyester B, and mica (AB-25S, manufactured by Yamaguchi Mica Co., Ltd.) (scale-like filler, average particle diameter: 25 μm) were changed as follows.

Powder of liquid crystalline aromatic polyester A: 49.5 parts by mass
Powder of liquid crystalline aromatic polyester B: 40.5 parts by mass
Mica: 10 parts by mass Example 3

A foamed molded article provided with an inner layer composed of a foamed layer and an outer layer composed of a non-foamed layer was produced by the same method as in Example 1 except that the mixing amounts of the powder of the liquid crystalline aromatic polyester A and the powder of the liquid crystalline aromatic polyester B were changed as follows, and the following talc was used in place of mica.

Powder of liquid crystalline aromatic polyester A: 53.35 parts by mass
Powder of liquid crystalline aromatic polyester B: 43.65 parts by mass
Talc (X-50, manufactured by Nippon Talc Co., Ltd.) (scale-like filler, average particle diameter: 22 μm): 3 parts by mass Example 4

A foamed molded article provided with an inner layer composed of a foamed layer and an outer layer composed of a non-foamed layer was produced by the same method as in Example 1 except that the mixing amounts of the powder of the liquid crystalline aromatic polyester A and the powder of the liquid crystalline aromatic polyester B were changed as follows, and the following talc was used in place of mica.

Powder of liquid crystalline aromatic polyester A: 52.25 parts by mass
Powder of liquid crystalline aromatic polyester B: 42.75 parts by mass
Talc (X-50, manufactured by Nippon Talc Co., Ltd.) (scale-like filler, average particle diameter: 22 μm): 5 parts by mass Example 5

A foamed molded article having a flat plate shape (250 mm×360 mm×2 mmt) and provided with an inner layer composed of a foamed layer and an outer layer composed of a non-foamed layer was produced by the same method as in Example 1 by mixing 49.5 parts by mass of the powder of the liquid crystalline aromatic polyester A, 40.5 parts by mass of the powder of the liquid crystalline aromatic polyester B, and 10 parts by mass of talc "X-50" manufactured by Nippon Talc Co., Ltd.

Example 6

A foamed molded article having a flat plate shape (250 mm×360 mm×3 mmt) and provided with an inner layer composed of a foamed layer and an outer layer composed of a non-foamed layer was produced by the same method as in Example 1 by mixing 49.5 parts by mass of the powder of the liquid crystalline aromatic polyester A, 40.5 parts by mass of the powder of the liquid crystalline aromatic polyester B, and 10 parts by mass of talc "X-50" manufactured by Nippon Talc Co., Ltd.

Comparative Example 1

A foamed molded article was produced by the same method as in Example 1 described above except that the amount of the powder of the liquid crystalline aromatic polyester A added was changed to 55 parts by mass, the amount of the powder of the liquid crystalline aromatic polyester B added was changed to 45 parts by mass, and a resin composition for foam molding which contained 100 parts by mass of the liquid crystalline aromatic polyester resin and contained no filler was used. However, the resin did not foam and a foamed molded article could not be obtained.

Comparative Example 2

A foamed molded article was produced by the same method as in Example 1 described above except that 41.25 parts by mass of the powder of the liquid crystalline aromatic polyester A, 33.75 parts by mass of the powder of the liquid crystalline aromatic polyester B, and 25 parts by mass of talc "X-50" manufactured by Nippon Talc Co., Ltd. were mixed.

Comparative Example 3

A foamed molded article was produced by the same method as in Example 1 described above except that 41.25 parts by mass of the powder of the liquid crystalline aromatic polyester A, 33.75 parts by mass of the powder of the liquid crystalline aromatic polyester B, and 25 parts by mass of mica "AB-25S" manufactured by Yamaguchi Mica Co., Ltd. were mixed.

The specific gravities, weight reduction rates, elastic moduli and loss factors of the foamed molded articles of Examples 1 to 6 and Comparative Examples 1 to 3 are listed in Table 1.

In addition, the specific gravities, elastic moduli and loss factors of non-foamed molded articles (described as "non-foamed state" in Table 1) produced by injection molding of the resin compositions for foam molding used in Examples 1 to 6 and Comparative Examples 1 to 3 without injecting a supercritical fluid, using pellets produced by the above-described method, are listed in Table 1.

In the following Table 1, the abbreviation "LCP" means "liquid crystalline aromatic polyester".

TABLE 1

| | | Non-foamed state | | | Foamed molded article | | | |
| --- | --- | --- | --- | --- | --- | --- | --- | --- |
| | Composition | Specific gravity | Elastic modulus (MPa) | Loss factor | Specific gravity | Weight reduction rate (%) | Elastic modulus (MPa) | Loss factor |
| Ex. 1 | LCP/Mica = 95/5 | 1.41 | 4,300 | 0.05 | 0.73 | 48 | 2,500 | 0.05 |
| Ex. 2 | LCP/Mica = 90/10 | 1.45 | 5,400 | 0.05 | 0.80 | 45 | 4,400 | 0.04 |
| Ex. 3 | LCP/Talc = 97/3 | 1.41 | 3,200 | 0.06 | 0.56 | 60 | 2,600 | 0.05 |
| Ex. 4 | LCP/Talc = 95/5 | 1.43 | 4,100 | 0.05 | 0.70 | 51 | 3,600 | 0.05 |
| Ex. 5 | LCP/Talc = 90/10 | 1.47 | 5,100 | 0.06 | 1.09 | 26 | 3,600 | 0.05 |
| Ex. 6 | LCP/Talc = 90/10 | 1.47 | 5,100 | 0.06 | 0.79 | 46 | 2,900 | 0.06 |
| Comp. Ex. 1 | LCP 100 | 1.37 | 2,900 | 0.05 | No foaming occurred | | | |
| Comp. Ex. 2 | LCP/Talc = 75/25 | 1.58 | 8,000 | 0.05 | Weight reduction was insufficient, and a favorable foamed molded article could not be obtained | | | |
| Comp. Ex. 3 | LCP/Mica = 75/25 | 1.58 | 10,100 | 0.05 | | | | |

As shown in the above results, in Examples 1 to 6 to which the present invention was applied, it was possible to achieve high weight reduction rates while the loss factor values were almost the same value as those of the non-foamed state. That is, the molded article to which the present invention was applied was able to reduce weight while maintaining the vibration damping properties.

On the other hand, in Comparative Examples 1 to 3 to which the present invention was not applied, foaming was insufficient so that foaming did not occur or the weight reduction rate could not be calculated, and a foamed molded product could not be obtained.

INDUSTRIAL APPLICABILITY

The present invention can provide a liquid crystalline polymer composition for foam molding to be used for a foamed molded article which is lightweight and excellent in vibration damping properties, a method for producing a foamed molded article, and a foamed molded article, and is therefore extremely useful industrially.

REFERENCE SIGNS LIST

1: Foamed molded article; 2, 4: Non-foamed layer; 3: Foamed layer; 30: Injection molding machine; 11: Main body; 12: Mold; 21: Introduction device; 211: Gas cylinder; 212: Booster; 213: Control valve

The invention claimed is:

1. A foam prepared from a liquid crystal polymer composition for foam molding using a supercritical fluid as a foaming agent,
the liquid crystal polymer composition comprising a liquid crystalline polymer and a scale-like inorganic filler, and containing no fibrous inorganic filler,
wherein the liquid crystal polymer is a liquid crystalline aromatic polyester resin having a repeating unit (1), a repeating unit (2) and a repeating unit (3):

—O—Ar$^1$—CO— (1)

—CO—Ar$^2$—CO— (2)

—X—Ar$^3$—Y— (3)

—Ar$^4$—Z—Ar$^5$— (4)

wherein in the formulas, Ar$^1$ represents a phenylene group, a naphthylene group or a biphenylylene group; Ar$^2$ and Ar$^3$ each independently represent a phenylene group, a naphthylene group, a biphenylylene group or a group represented by the above formula (4); X and Y each independently represent an oxygen atom or —NH—; Ar$^4$ and Ar$^5$ each independently represent a phenylene group or a naphthylene group; Z represents an oxygen atom, a sulfur atom, a carbonyl group, a sulfonyl group or an alkylidene group; and hydrogen atoms of Ar$^1$, Ar$^2$ or Ar$^3$ may each independently be substituted with a halogen atom, an alkyl group or an aryl group;
wherein a content of the liquid crystalline polymer is 80 parts by mass or more and 97 parts by mass or less, and a content of said scale-like inorganic filler is 3 parts by mass or more and 20 parts by mass or less with respect to 100 parts by mass of said liquid crystalline polymer composition.

2. The a foam prepared from a liquid crystal polymer composition for foam molding according to claim 1, wherein the repeating unit (1) is derived from p-hydroxybenzoic acid, the repeating unit (2) is at least one member selected from the group consisting of a repeating unit derived from terephthalic acid and a repeating unit derived from isophthalic acid, and the repeating unit (3) is derived from 4,4'-dihydroxybiphenyl.

3. A method for producing a foamed molded article, the method comprising
a step of melt-kneading a mixture containing the liquid crystalline polymer composition for foam molding according to claim 1 and a supercritical fluid, and
a step of foam molding said mixture by lowering at least one of a pressure and a temperature of said melt-kneaded mixture to below a critical point of said supercritical fluid.

4. The method for producing a foamed molded article according to claim 3, wherein a content of said foaming agent in said mixture is 0.01 parts by mass or more and 10 parts by mass or less with respect to 100 parts by mass of said liquid crystalline polymer composition for foam molding.

5. A foamed molded article molded from the liquid crystalline polymer composition for foam molding according to claim 1 and having a weight reduction rate represented by the following formula (1) of 20% or more and 90% or less, weight reduction rate (%)=100×(dB−dA)/dB (1)

wherein, dB represents a true density (g/cm$^3$) of said liquid crystalline polymer composition for foam molding, and dA represents an apparent density (g/cm$^3$) of said foamed molded article.

6. A method for producing a foamed molded article, the method comprising
a step of melt-kneading a mixture containing the liquid crystalline polymer composition for foam molding according to claim 2 and a supercritical fluid, and
a step of foam molding said mixture by lowering at least one of a pressure and a temperature of said melt-kneaded mixture to below a critical point of said supercritical fluid.

7. The method for producing a foamed molded article according to claim 6, wherein a content of said foaming agent in said mixture is 0.01 parts by mass or more and 10 parts by mass or less with respect to 100 parts by mass of said liquid crystalline polymer composition for foam molding.

8. A foamed molded article molded from the liquid crystalline polymer composition for foam molding according to claim 2 and having a weight reduction rate represented by the following formula (1) of 20% or more and 90% or less, weight reduction rate (%)=100×(dB−dA)/dB (1)

wherein, dB represents a true density (g/cm$^3$) of said liquid crystalline polymer composition for foam molding, and dA represents an apparent density (g/cm$^3$) of said foamed molded article.

9. The a foam prepared from a liquid crystal polymer composition for foam molding according to claim 1, wherein the content of the liquid crystalline polymer is 90 parts by mass or more and 97 parts by mass or less, and
the content of said scale-like inorganic filler is 3 part by mass or more and 10 parts by mass or less with respect to 100 parts by mass of said liquid crystalline polymer composition.

10. The a foam prepared from a liquid crystal polymer composition for foam molding according to claim 2, wherein the content of the liquid crystalline polymer is 90 parts by mass or more and 97 parts by mass or less, and
the content of said scale-like inorganic filler is 3 part by mass or more and 10 parts by mass or less with respect to 100 parts by mass of said liquid crystalline polymer composition.

11. The a foam prepared from a liquid crystal polymer composition for foam molding according to claim 1, wherein the scale-like inorganic filler is talc or mica.

12. The a foam prepared from a liquid crystal polymer composition for foam molding according to claim 2, wherein the scale-like inorganic filler is talc or mica.

13. The a foam prepared from a liquid crystal polymer composition for foam molding according to claim 9, wherein the scale-like inorganic filler is talc or mica.

14. The a foam prepared from a liquid crystal polymer composition for foam molding according to claim 10, wherein the scale-like inorganic filler is talc or mica, aromatic polyester resin.

* * * * *